(No Model.) 4 Sheets—Sheet 1.
H. E. HAWKSWORTH.
MEANS FOR RAISING AND LOWERING DENTAL CHAIRS.
No. 577,254. Patented Feb. 16, 1897.
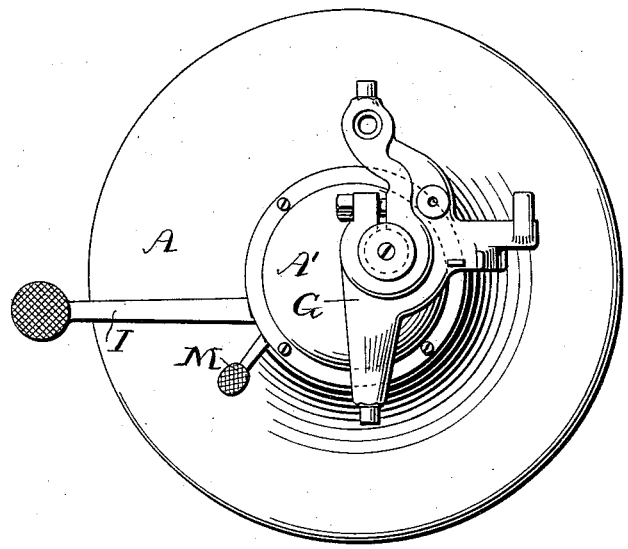
FIG. 2.
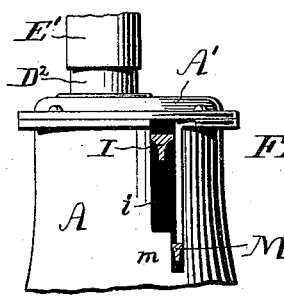
FIG. 11.
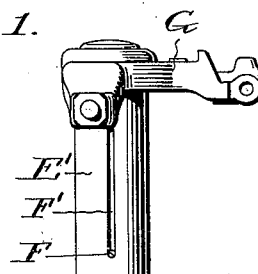
FIG. 1.
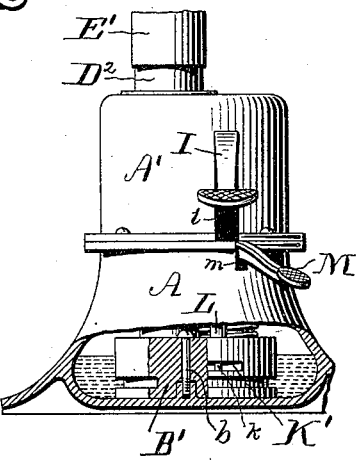
FIG. 12.
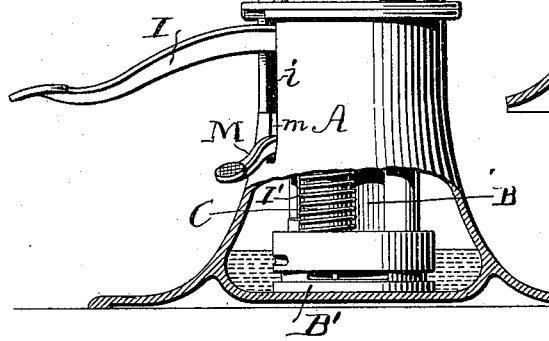
WITNESSES: INVENTOR:
Theodore B. Paill H. E. Hawksworth
Edw. F. Simpson, Jr. By atty J. L. Peyton
THE NORRIS PETERS CO., PHOTO-LITHO., WASHINGTON, D.C.

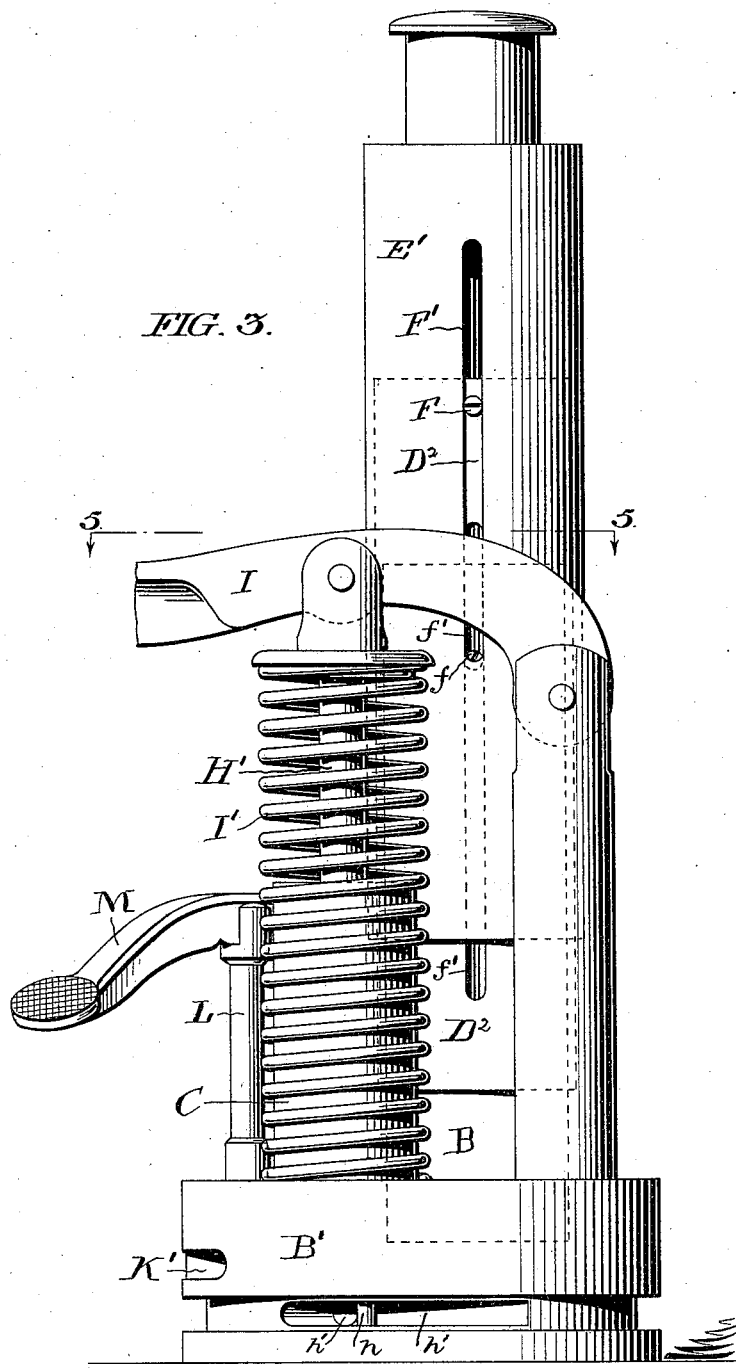

(No Model.)  4 Sheets—Sheet 3.
H. E. HAWKSWORTH.
MEANS FOR RAISING AND LOWERING DENTAL CHAIRS.
No. 577,254. Patented Feb. 16, 1897.
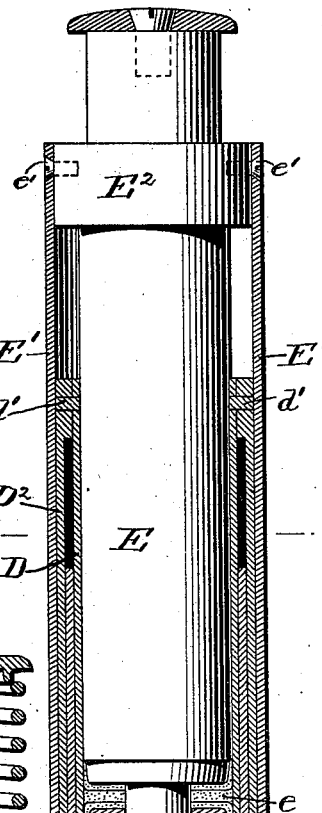
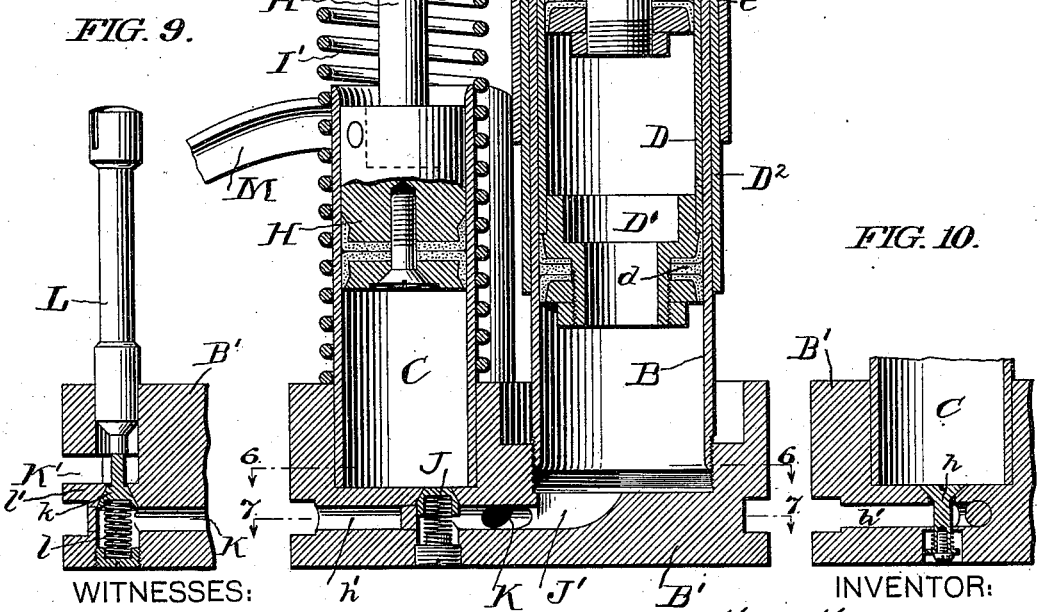
WITNESSES:
Theodore B. Vaill
Edw. F. Simpson, Jr.
INVENTOR:
H. E. Hawksworth
THE NORRIS PETERS CO., PHOTO-LITHO., WASHINGTON, D. C.

(No Model.)   H. E. HAWKSWORTH.   4 Sheets—Sheet 4.
MEANS FOR RAISING AND LOWERING DENTAL CHAIRS.

No. 577,254.   Patented Feb. 16, 1897.

WITNESSES:
Theod. B. Vail
Edw. F. Simpson, Jr.

INVENTOR:
H. E. Hawksworth

UNITED STATES PATENT OFFICE.

HARRY E. HAWKSWORTH, OF PHILADELPHIA, PENNSYLVANIA, ASSIGNOR TO THE S. S. WHITE DENTAL MANUFACTURING COMPANY, OF SAME PLACE.

MEANS FOR RAISING OR LOWERING DENTAL CHAIRS.

SPECIFICATION forming part of Letters Patent No. 577,254, dated February 16, 1897.

Application filed October 17, 1896. Serial No. 609,192. (No model.)

*To all whom it may concern:*

Be it known that I, HARRY E. HAWKSWORTH, a citizen of the United States, residing at Philadelphia, in the county of Philadelphia and State of Pennsylvania, have invented certain new and useful Improvements in Means for Raising or Lowering Dental Chairs; and I do hereby declare the following to be a full, clear, and exact description of the invention, such as will enable others skilled in the art to which it appertains to make and use the same.

My invention relates to certain improvements, as hereinafter claimed, in hydraulic raising and lowering mechanism applicable to dental chairs.

Figure 5:
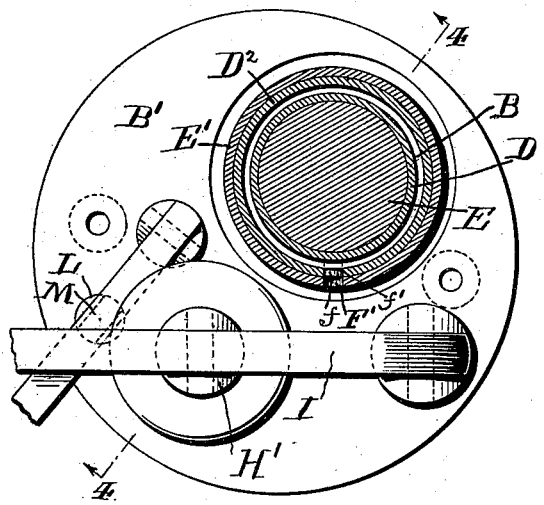
Figure 8:
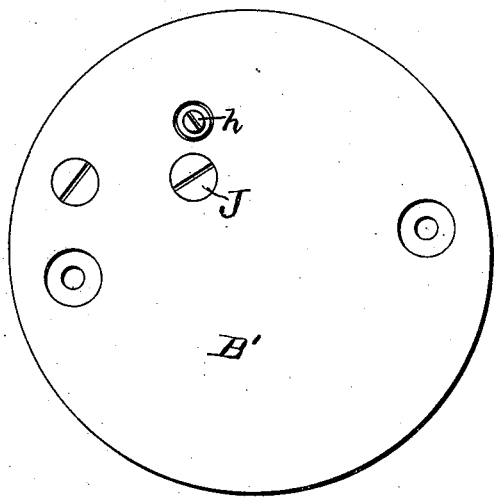
Figure 6:
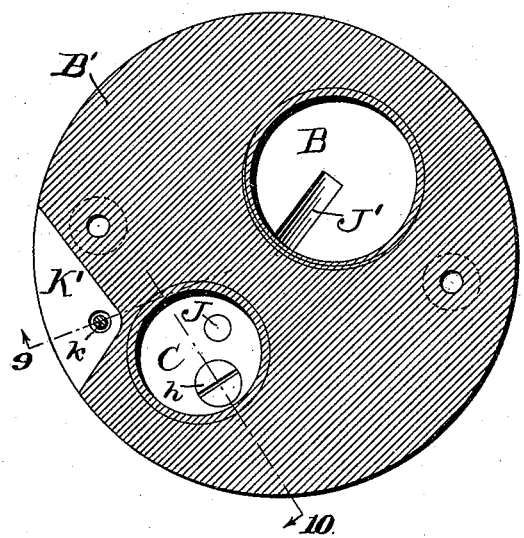
Figure 7:
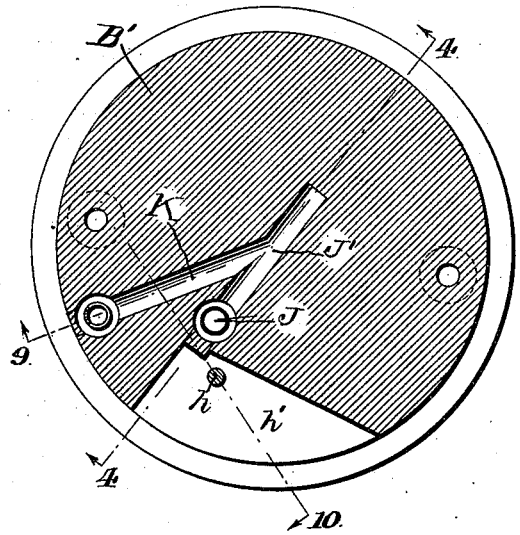

In the accompanying drawings, which represent a suitable embodiment of my improvements, Figure 1 is a side elevation, partly in section, and Fig. 2 a plan view, of the mechanism adapted for attachment of the chair-body. Fig. 3 shows, on a larger scale, a side elevation of the mechanism with the pedestal and yoke for supporting the chair-body omitted. Fig. 4 is a view of parts shown in Fig. 3, mainly in vertical central section, on the lines 4 of Figs. 5 and 7. Fig. 5 is a view, partly in plan and partly in section, on the lines 5 of Figs. 3 and 4; Fig. 6, a section on the line 6 of Fig. 4; Fig. 7, a section on the line 7 of Fig. 4; Fig. 8, a bottom view or inverted plan of the base-piece or carrier for the cylinders of the pump and the plunger; Fig. 9, a detail view, partly in elevation, and partly in section, on the lines 9 of Figs. 6 and 7, showing the valve mechanism for allowing liquid to flow from the plunger-cylinder; and Fig. 10, a section on the lines 10 of Figs. 6 and 7, showing the suction-valve of the pump. Fig. 11 is a detail view showing a portion of the pedestal in elevation with the raising and lowering lever and valve-tripping lever in section. Fig. 12 is a view of a portion of the pedestal of slightly-modified construction.

A suitable hollow pedestal or base A, provided with a detachable cap A', serves to contain oil or equivalent liquid and to sustain a support-cylinder B and a pump-cylinder C. These cylinders are secured to a suitable base-piece or carrier B', which rests within the pedestal and upon the bottom thereof. This cylinder-carrier may readily be removed from the pedestal, to which it is detachably fastened in suitable way, as by screws or bolts $b\ b$.

The raising and lowering support for the chair-body is made in telescoping sections and is adapted to project through an opening in the pedestal-cap A' and to slide up and down the support-cylinder B. The chair-body support consists of a lower section and an upper section, each section having an inner and an outer member. The tubular inner member D of the lower section of the support is provided at its lower end with a hollow or centrally open head or piston D' and works in the cylinder B. This piston is provided with suitable packing $d$, so as to fit liquid-tight in its cylinder. The tubular outer member $D^2$ of the lower section of the support fits around the cylinder so as to slide thereon, and is connected at its upper end with the upper end of the inner member D, so as to be rigid therewith. Pins $d'\ d'$ serve to connect the two members of the lower section of the support. By this construction it will be seen that the cylinder is embraced both inside and outside by the lower section of the support, thus making a very durable sliding connection between the parts and preventing vibration or lateral movement of the support-section upon the cylinder. The inner member E of the upper section of the support is fitted to slide in the inner member D of the lower section and is provided with suitable packing $e$ at its lower end, so as to fit liquid-tight therein.

The outer member E' of the upper section of the support snugly embraces and slides upon the outer member $D^2$ of the lower section. The outer member of the upper section of the support is connected at its upper end with the inner member thereof, so as to be rigid therewith. A collar $E^2$ and screws $e'$ serve to connect the two members. In this way a durable non-vibrating sliding connection between the upper and lower sections of the support is provided for.

Suitable stops are provided to limit upward movement of the sectional support when actuated as farther on to be explained. As shown, a screw-pin $f$ in the support-cylinder engages a slot $f'$ in the outer member of the lower section of the support, so as to arrest upward movement of this section when the lower end or wall of the slot is brought to the level of the pin, and a screw-pin F in the outer member of the lower section of the support engaging a slot F' in the outer member of the upper section of the support arrests upward movement of the upper section when the lower end of the slot is brought to the level of the pin. It will be seen that the stop-pins and grooves prevent the turning of the support-sections.

A yoke or carrier G at the upper end of the raising and lowering support serves for mounting a suitable chair-body in well-known way.

From the above description it will be seen that when the telescoping support is in its lowermost position, with the piston D' at the bottom of its cylinder and the lower end of the inner member E of the upper section of the support in contact with this piston, liquid pumped into the cylinder beneath the support-piston will first move the piston and both sections of the support upward, and that when the lower section of the support has been raised to the limit of its movement liquid passing through the piston as the pumping continues acts upon the upper section of the support to lift it as far as may be desired within the range of its movement. It will further be seen that a very stiff non-vibrating connection is made between the telescoping support and its cylinder due to the double contact between the cylinder and the lower section of the support, which snugly embraces the cylinder within and without, while a like connection is made between the sections of the support which have corresponding double contact. Thus the chair-body may be very firmly supported even when at its greatest elevation.

Mechanism suitable for pumping the liquid into the support-cylinder to elevate the support and for allowing the liquid to slowly flow from the cylinder to permit of gradual descent of the support is as follows:

The pump-cylinder C is provided with the piston H, the rod H' of which is operated upon by a foot-actuated lever I, working through a slot $i$ in the pedestal to force the piston downward. A spring I' acts to uphold the actuating-lever and to return it to its normal position after having been depressed. This lever is pivoted to a standard on the carrier B'. A valve $h$ and passage $h'$ serve to admit liquid from the pedestal-reservoir to the pump-cylinder at the bottom thereof.

An outlet-valve J at the bottom of the pump-cylinder and a passage J' serve to allow the liquid to pass from the pump-cylinder to the support-cylinder at the bottom thereof. Downward movement of the actuating-lever forces liquid from the pump-cylinder to the support-cylinder. Upward movement of the lever opens the suction-valve $h$ and allows liquid to pass into the pump-cylinder, the outlet-valve J being closed, as will be understood. A two-part passage K K' for escape of the liquid from the support-cylinder back to the reservoir is provided with an outlet-valve $k$, acted upon by a spring $l$, which normally holds the valve to its seat, which is formed in a partition $l'$ between the upper and lower passages K K'. This outlet-valve is adapted to be tripped by an upright thrust rod or plunger L, acted upon by a lever M, projecting through a slot $m$ in the pedestal in position to be forced downward by foot. This valve-tripping lever is pivoted to a standard on the carrier B'. When the valve is tripped, the escape of liquid from the support-cylinder allows the support to descend. The slots $i\ m$ for the levers to work through extend to the top of the pedestal. It will be seen that the cylinder-carrier B' supports within the pedestal all parts of the raising and lowering mechanism, including the levers for actuating such mechanism, and that all parts may readily be removed from the pedestal simply by removing the attaching-screws of the pedestal-cap, without disconnecting from each other the various working parts and their levers.

In the modification shown by Fig. 12 the pedestal-body is shown as decreased in height and the pedestal-cap lengthened to allow of the removal and ready inspection of parts without disconnecting them simply by detaching the cap-securing screws. In this modification the slot for the foot-actuated lever is in the cap instead of in the body of the pedestal.

It is obvious that instead of providing the piston at the lower end of the inner member of the lower section of the telescoping support with the single perforation or central opening to constitute a passage for the liquid to act on the upper section of the support, so as to elevate it after the limit of the upward movement of the lower section, the liquid-passage through the piston may be otherwise provided, as by a series of small perforations arranged in any suitable way.

I claim as my invention—

1. The combination of the support-cylinder, the lower section of the telescoping support consisting of an inner and an outer member, with the inner member working within the support-cylinder and provided with the piston having the liquid-passage through it, and the outer member fitting about and working outside the cylinder, and the upper section of the telescoping support consisting of the inner and the outer members, one of said members working inside the lower section of the support and the other working outside thereof, substantially as and for the purpose set forth.

2. The combination of the pedestal constituting a liquid-reservoir and provided with the detachable cap, the cylinder-carrier detachably secured within the pedestal to the bottom thereof, and the raising and lowering mechanism and the actuating-levers thereof mounted upon said carrier and removable from the pedestal therewith, substantially as and for the purpose set forth.

In testimony whereof I affix my signature in presence of two witnesses.

HARRY E. HAWKSWORTH.

Witnesses:
R. DALE SPARHAWK,
JOHN W. GILBERT.